United States Patent
Chan et al.

(10) Patent No.: US 8,241,784 B2
(45) Date of Patent: Aug. 14, 2012

(54) COVER MECHANISM

(75) Inventors: Kai-Po Chan, Tu-Cheng (TW);
 Chao-Kun Tseng, Tu-Cheng (TW);
 Cheng Yao, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 404 days.

(21) Appl. No.: 12/538,260

(22) Filed: Aug. 10, 2009

(65) Prior Publication Data
 US 2010/0136399 A1   Jun. 3, 2010

(30) Foreign Application Priority Data
 Dec. 1, 2008  (CN) .......................... 2008 1 0305879

(51) Int. Cl.
 *H01M 2/08* (2006.01)
 *H01M 2/10* (2006.01)
(52) U.S. Cl. ...... 429/175; 429/96; 429/100; 361/679.56
(58) Field of Classification Search .................. 429/175, 429/96, 100; 361/679.56
 See application file for complete search history.

(56) References Cited

U.S. PATENT DOCUMENTS

| 6,175,488 | B1 * | 1/2001 | Seto et al. | 361/679.19 |
| 7,839,627 | B2 * | 11/2010 | Tanaka et al. | 361/679.3 |
| 2003/0151887 | A1 * | 8/2003 | Siddiqui | 361/680 |

* cited by examiner

*Primary Examiner* — Patrick Ryan
*Assistant Examiner* — Julian Anthony
(74) *Attorney, Agent, or Firm* — Altis Law Group, Inc.

(57) ABSTRACT

A cover mechanism for an electronic device is provided including a base member, a cover member, and two connecting members. The cover member is movably and permanently attached to the base member, including a limiting assembly, and defining a sliding groove. The connecting members connect the cover member and the base member. Each connecting member includes a connecting portion, a positioning end portion securely positioned on the base member, and a limiting end portion. The positioning end portion and the limiting end portion connect two opposite ends of the connecting portion. The connecting portions are slidably received in the sliding grooves, and the limiting end portions are slidable to resist the limiting assembly.

12 Claims, 3 Drawing Sheets

COVER MECHANISM

BACKGROUND

1. Technical Field

The present disclosure relates to cover mechanisms, and particularly to a cover mechanism used in an electronic device.

2. Description of Related Art

Electronic devices usually have battery cover mechanisms to allow for frequent installation/removal of batteries. The cover mechanisms usually include covers with locks. The covers are typically locked to the electronic devices by latches to cover the battery compartment. However, the covers are often not permanently attached to the electronic device. Thus, the covers may easily be misplaced or lost when not locked to the electronic devices.

Therefore, there is room for improvement within the art.

BRIEF DESCRIPTION OF THE DRAWING

Many aspects of the new cover mechanism can be better understood with reference to the following drawings. The components in the drawings are not necessarily drawn to scale, the emphasis instead being placed upon clearly illustrating the principles of the new cover mechanism. Moreover, in the drawings, like reference numerals designate corresponding parts throughout the several views.

DETAILED DESCRIPTION

Figure 1:
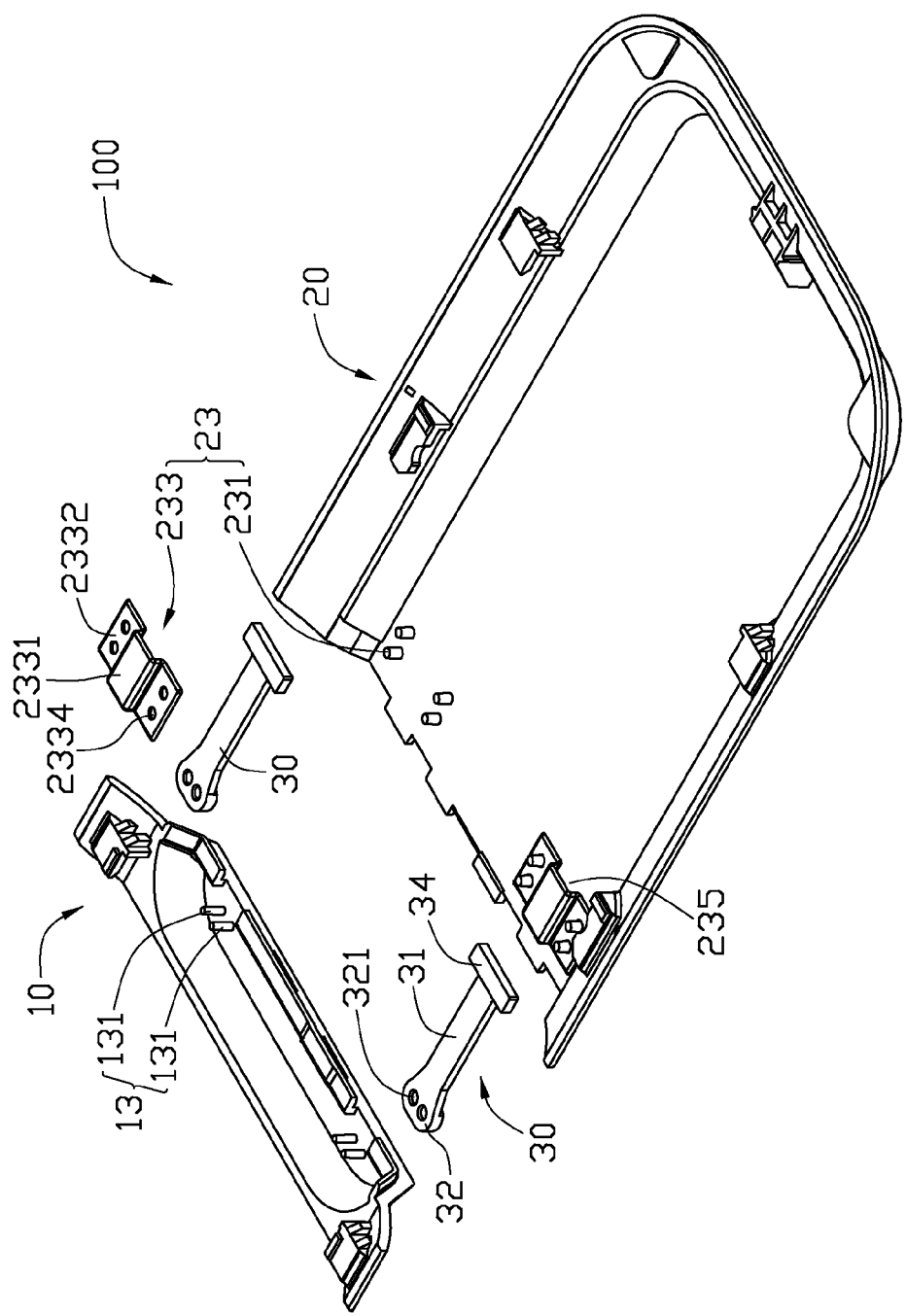
FIG. 1 is an exploded, isometric view of a cover mechanism according to an exemplary embodiment.
Figure 2:
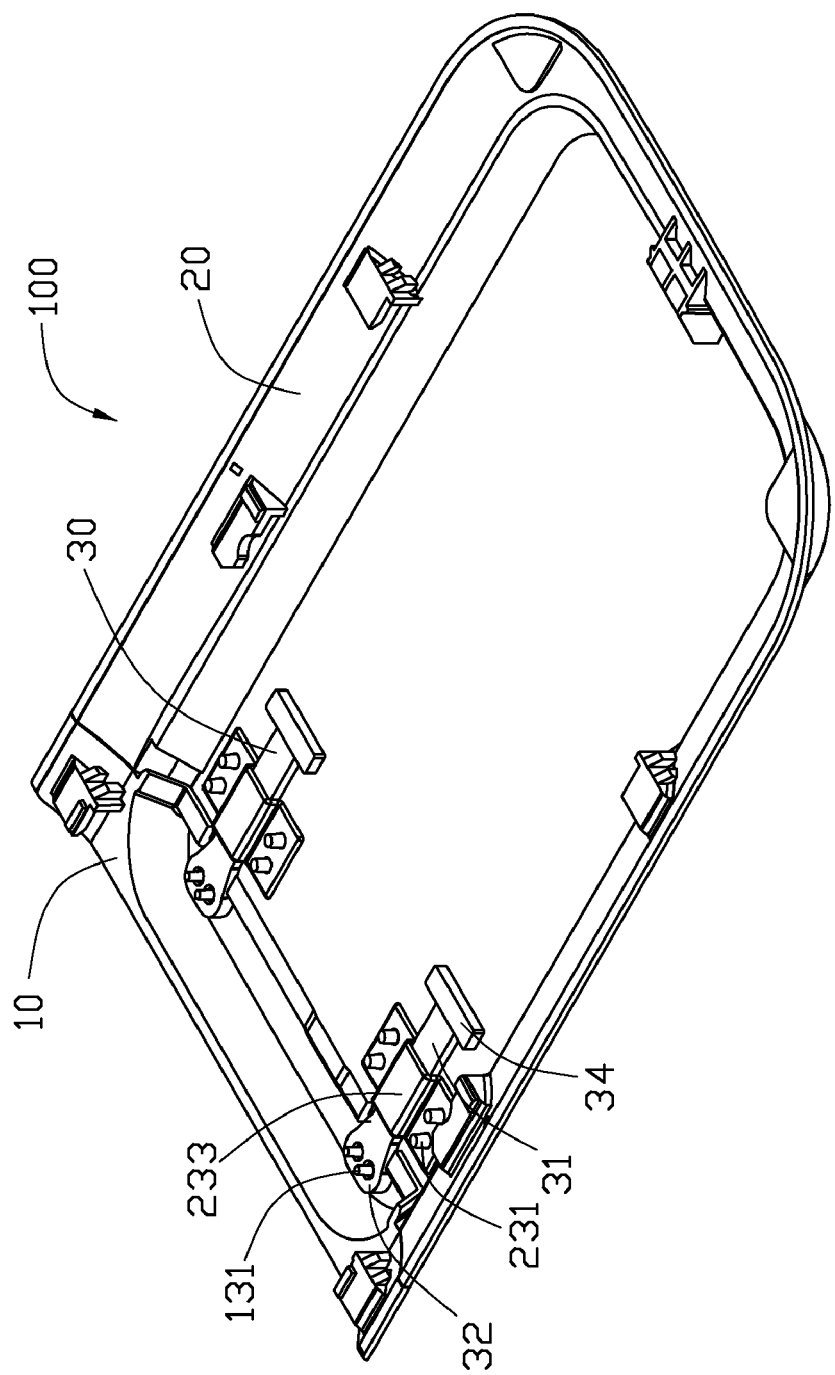
FIG. 2 is an assembled view of the cover mechanism shown in FIG. 1, and also in the closed position.
Figure 3:
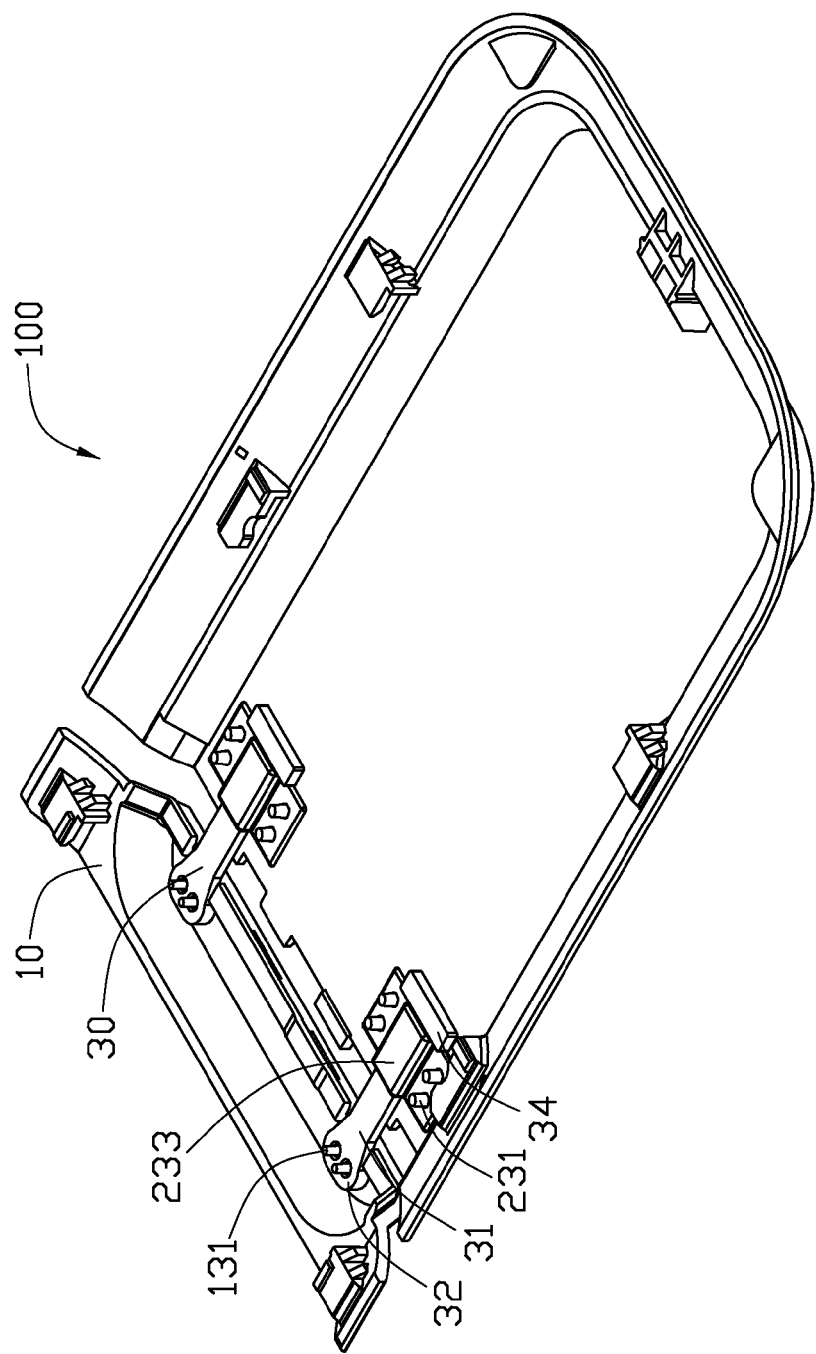
FIG. 3 is similar to FIG. 2, but in an opened positions.

FIGS. 1 through 3 show an exemplary cover mechanism 100 for a portable electronic device, which includes a base member 10 (partially shown), a cover member 20, and two connecting members 30. The base member 10 can be a housing of the portable electronic device, and the cover member 20 can be a battery cover of the portable electronic device. The cover member 20 can be movably fixed to the base member 10 (see FIGS. 2 and 3).

Referring to FIG. 1, the interior surface of the base member 10 has two spaced positioning assemblies 13 formed on an end. Each positioning assembly 13 includes two spaced first positioning columns 131 protruding from the interior surface of the base member 10.

The interior surface of the cover member 20 has two spaced limiting assemblies 13 formed on an end. Each limiting assembly 23 includes four second positioning columns 231 and a limiting member 233. The four second positioning columns 231 protrude from the interior surface of the cover member 20. The limiting member 233 is a metallic sheet including a limiting portion 2331 and two securing portions 2332 connecting to the two opposite ends of the limiting portion 2331. Each securing portion 2332 defines two securing holes 2334 therethrough and corresponding to the two second positioning columns 231. The limiting member 233 can be secured to the cover member 20 by securing (e.g., hot-melting) the second positioning columns 231 into the securing holes 2334. Once the limiting member 233 is secured, a sliding groove 235 is defined between the limiting portion 2331 and the interior surface of the cover member 20.

The connecting member 30 can be made of a rubbery or low rigidity material. The connecting member 30 includes a connecting portion 31, a positioning end portion 32 and a limiting end portion 34. The positioning end portion 32 and the limiting end portion 34 are connected to each other by the connecting portion 31. The positioning end portion 32 defines two positioning holes 321. The positioning end portion 32 can be securely positioned to the base member 10 by positioning of the first positioning columns into the positioning holes 321. The limiting end portion 34 extends perpendicularly to the connecting portion 31 with an extension width larger than the width of the sliding groove 235.

Referring to FIGS. 2 and 3, during assembly, the positioning end portion 32 can be securely positioned to the base member 10. The connecting portion 31 can be placed between each two second positioning columns 231. By fixing the limiting member 233 to the cover member 20 above the connecting portion 31, the connecting portion 31 can be slidably received in the sliding groove 235. At this stage, the connecting members 30 connect the cover member 20 to the base member 10 as a whole.

FIG. 2 shows the closed position of the cover mechanism 100, in which the cover member 20 is closed relative to the base member 10. The cover member 20 abuts against the base member 10. The limiting end portions 34 are separated from the limiting members 233.

FIG. 3 shows the opened position of the cover mechanism 100. To open the cover mechanism 100, the cover member 20 is pushed away from the base member 10, enabling the connecting members 30 to slide along the sliding grooves 235. During this course, the limiting end portions 34 move towards the limiting members 233. When the limiting end portions 34 resist the limiting members 233, the sliding of the cover mechanism 100 is stopped. At this time, the cover member 20 is open relative to the base member 10 and can be bent out of the way due to the connecting member 30 being made from a rubbery or low-rigidity material, while still attached to the base member 10.

It is to be understood that the limiting member 233 may be e.g., welded to the cover member 10. In this case, the second positioning column 231 and the securing holes 2334 of the limiting member 233 are not necessary.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover mechanism, comprising:
a base member comprising positioning assemblies;
a cover member movably and permanently attached to the base member, comprising two limiting assemblies and defining two sliding grooves; and
two connecting members connecting the cover member and the base member, each of the two connecting members comprising a connecting portion, a positioning end portion securely positioned on the base member, and a limiting end portion, the positioning end portion and the limiting end portion connecting two opposite ends of the connecting portion, the connecting portions slidably received in the sliding grooves, the limiting end portions being slidable to resist the limiting assemblies, each of the positioning assemblies including a first positioning column on the base member, each of the positioning end portions defining a positioning hole, the positioning end portion securely positioned to the base member by a securely positioning of the first positioning column into the positioning hole.

2. The cover mechanism as claimed in claim 1, wherein the limiting assembly comprises a limiting member, the limiting member comprises a limiting portion and two securing portions connecting two opposite ends of the limiting portion, the securing portions securing the limiting member to the cover member, the sliding groove defined by the limiting portion and the cover member.

3. The cover mechanism as claimed in claim 2, wherein the limiting assembly further comprises two second positioning columns formed on the cover member, each of the two securing portions defines a securing hole, the limiting member secured to the cover member by the securing of the second positioning columns into the securing holes.

4. The cover mechanism as claimed in claim 2, wherein the limiting members are welded to the cover member.

5. The cover mechanism as claimed in claim 1, wherein the limiting end portion extends substantially perpendicularly to the connecting portion with an extension width larger than the width of the sliding groove.

6. The cover mechanism as claimed in claim 1, wherein the connecting members is made of one of a rubbery material or a low rigidity material.

7. A cover mechanism used in a portable electronic device, comprising:
- a base member comprising a positioning assembly;
- a cover member movably and permanently attached to the base member, comprising a limiting assembly secured to the interior surface of the cover member, and defining a sliding groove between the limiting assembly and the interior surface;
- a connecting member permanently connecting the cover member with the base member, the connecting member comprising a connecting portion, a positioning end portion securely positioned on the base member, and a limiting end portion, the positioning end portion and the limiting end portion oppositely connecting the connecting portion, the connecting portions sliding along the sliding groove during opening or closing the cover mechanism, the limiting end portions resisting the limiting assembly when the cover mechanism is opened, and sliding to be separated from the limiting assembly when the cover mechanism is closed; and wherein, the positioning assembly comprises a first positioning column on the base member, the positioning end portion defines a positioning hole, the positioning end portion securely positioned to the base member by a securely positioning of the first positioning column into the positioning hole.

8. The cover mechanism as claimed in claim 7, wherein the limiting assembly comprises a limiting member, the limiting member comprises a limiting portion and two securing portions connecting two opposite ends of the limiting portion, the securing portions securing the limiting member to the cover member, the sliding groove defined by the limiting portion and the cover member.

9. The cover mechanism as claimed in claim 8, wherein the limiting assembly further comprises two second positioning columns formed on the cover member, each of the two securing portions defines a securing hole, the limiting member secured to the cover member by the securing of the second positioning columns into the securing holes.

10. The cover mechanism as claimed in claim 8, wherein the limiting members are welded to the cover member.

11. The cover mechanism as claimed in claim 7, wherein the limiting end portion extends substantially perpendicularly to the connecting portion with an extension width larger than the width of the sliding groove.

12. The cover mechanism as claimed in claim 7, wherein the connecting members is made of one of a rubbery material or a low rigidity material.

* * * * *